US012634155B2

(12) United States Patent
Qiu et al.

(10) Patent No.: US 12,634,155 B2
(45) Date of Patent: May 19, 2026

(54) CONSENSUS TRUSTED CLUSTER CHANGING METHOD, COMPUTER DEVICE AND COMPUTER-READABLE STORAGE MEDIUM

(71) Applicant: Hangzhou Hyperchain Technology Co., Ltd., Hangzhou (CN)

(72) Inventors: Weiwei Qiu, Hangzhou (CN); Fanglei Huang, Hangzhou (CN); Chao Yuan, Hangzhou (CN); Wei Li, Hangzhou (CN); Xuan Shang, Hangzhou (CN)

(73) Assignee: HANGZHOU HYPERCHAIN TECHNOLOGY CO., LTD., Hangzhou (CN)

( * ) Notice: Subject to any disclaimer, the term of this patent is extended or adjusted under 35 U.S.C. 154(b) by 280 days.

(21) Appl. No.: 18/368,761

(22) Filed: Sep. 15, 2023

(65) Prior Publication Data

US 2024/0097919 A1     Mar. 21, 2024

(30) Foreign Application Priority Data

Sep. 15, 2022     (CN) .......................... 202211119799.7

(51) Int. Cl.
| | | |
|---|---|---|
| *H04L 29/06* | (2006.01) | |
| *H04L 9/00* | (2022.01) | |
| *H04L 9/32* | (2006.01) | |

(52) U.S. Cl.
CPC .......... *H04L 9/3268* (2013.01); *H04L 9/3236* (2013.01); *H04L 9/3247* (2013.01); *H04L 9/50* (2022.05)

(58) Field of Classification Search
CPC ....... H04L 9/3268; H04L 9/50; H04L 9/3236; H04L 9/3247
See application file for complete search history.

(56) References Cited

U.S. PATENT DOCUMENTS

2017/0250826 A1*   8/2017   Yang ................... H04L 63/0823
2019/0288993 A1*   9/2019   Lin ..................... G06F 11/1425
(Continued)

FOREIGN PATENT DOCUMENTS

| | | |
|---|---|---|
| CN | 107276765 A | 10/2017 |
| CN | 110245517 A | 9/2019 |

(Continued)

OTHER PUBLICATIONS

Jayabalan, J. et al. "A Study on Distributed Consensus Protocols and Algorithms The Backbone of Blockchain Networks" 2021 International Conference on Computer Communication and Informatics (ICCCI—2021), Jan. 27-29, 2021, Coimbatore, INDIA.
(Continued)

*Primary Examiner* — Evans Desrosiers
(74) *Attorney, Agent, or Firm* — CANTOR COLBURN LLP

(57)     ABSTRACT

The embodiments of the disclosure are applicable to the technical field of blockchain and provide a consensus trusted cluster changing method, a computer device and a computer-readable storage medium. The method is applicable to a blockchain and includes: determining a current epoch of a newly added validator node of the consensus trusted cluster in the blockchain and a target epoch of the consensus trusted cluster; requesting target status information and proof of target cluster change from a target validator node in the target epoch; verifying the target status information according to the proof of target cluster change; and updating, in case where the target status information has been verified, status information of the newly added validator node according to the target status information to complete change of the consensus trusted cluster. Through the above method, a trusted synchronization target status may be determined.

20 Claims, 7 Drawing Sheets

(56)                    References Cited

U.S. PATENT DOCUMENTS

2019/0347444  A1      11/2019  Lowagie
2021/0234668  A1*      7/2021  Manamohan ......... H04L 9/3239

FOREIGN PATENT DOCUMENTS

| CN | 110336707 A | 10/2019 |
|----|-------------|---------|
| CN | 110557452 A | 12/2019 |
| CN | 110597832 A | 12/2019 |
| CN | 110708170 A | 1/2020 |
| CN | 110855445 A | 2/2020 |
| CN | 111212074 A | 5/2020 |
| CN | 111242617 A | 6/2020 |
| CN | 111275438 A | 6/2020 |
| CN | 111383021 A | 7/2020 |
| CN | 111444211 A | 7/2020 |
| CN | 111506656 A | 8/2020 |
| WO | 2020070515 A1 | 4/2020 |

OTHER PUBLICATIONS

Xue, L. "Research of blockchain consensus algorithm and its application", University of Science and Technology of China, May 26, 2021, 190 pages (English Abstract).

* cited by examiner

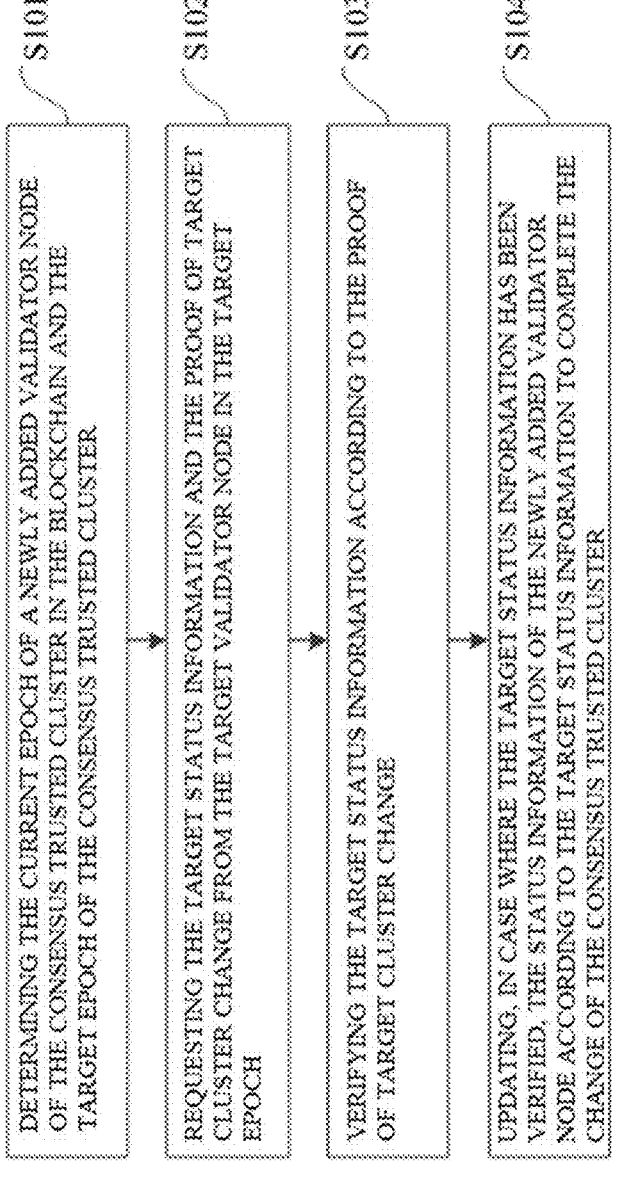

S101

DETERMINING THE CURRENT EPOCH OF A NEWLY ADDED VALIDATOR NODE OF THE CONSENSUS TRUSTED CLUSTER IN THE BLOCKCHAIN AND THE TARGET EPOCH OF THE CONSENSUS TRUSTED CLUSTER

S102

REQUESTING THE TARGET STATUS INFORMATION AND THE PROOF OF TARGET CLUSTER CHANGE FROM THE TARGET VALIDATOR NODE IN THE TARGET EPOCH

S103

VERIFYING THE TARGET STATUS INFORMATION ACCORDING TO THE PROOF OF TARGET CLUSTER CHANGE

S104

UPDATING, IN CASE WHERE THE TARGET STATUS INFORMATION HAS BEEN VERIFIED, THE STATUS INFORMATION OF THE NEWLY ADDED VALIDATOR NODE ACCORDING TO THE TARGET STATUS INFORMATION TO COMPLETE THE CHANGE OF THE CONSENSUS TRUSTED CLUSTER

FIG. 1

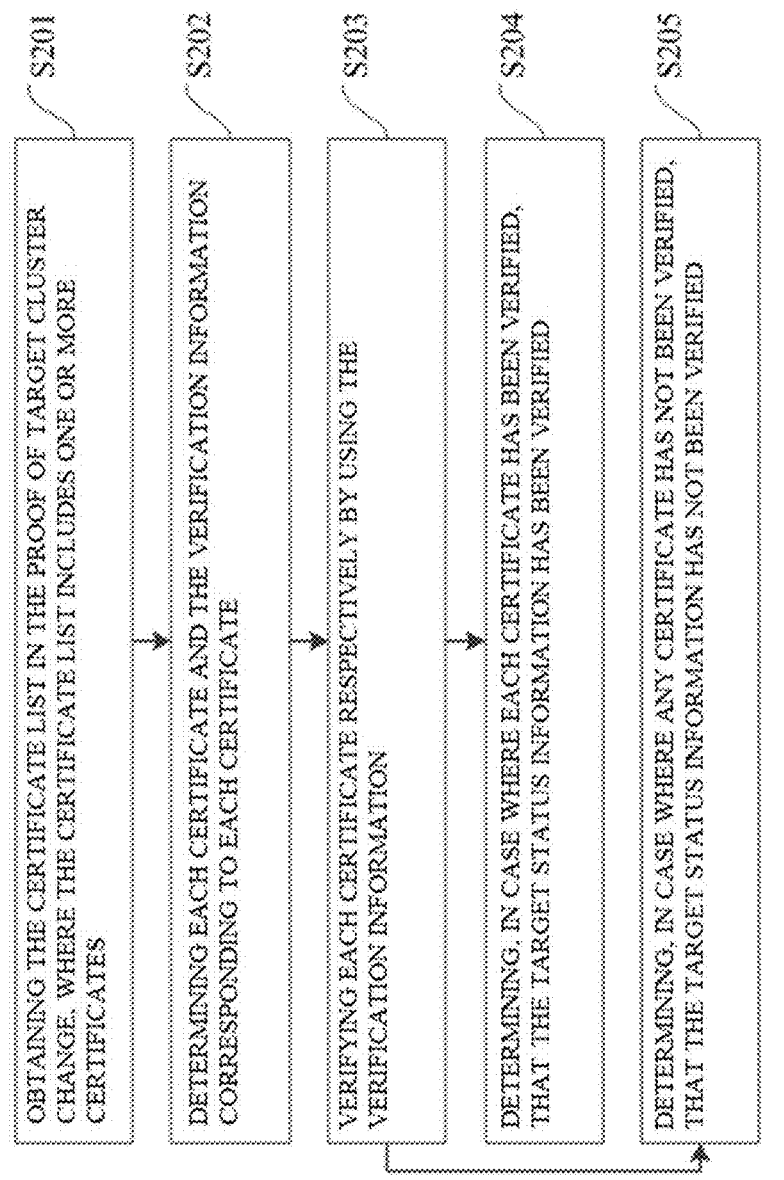

S201

OBTAINING THE CERTIFICATE LIST IN THE PROOF OF TARGET CLUSTER CHANGE, WHERE THE CERTIFICATE LIST INCLUDES ONE OR MORE CERTIFICATES

S202

DETERMINING EACH CERTIFICATE AND THE VERIFICATION INFORMATION CORRESPONDING TO EACH CERTIFICATE

S203

VERIFYING EACH CERTIFICATE RESPECTIVELY BY USING THE VERIFICATION INFORMATION

S204

DETERMINING, IN CASE WHERE EACH CERTIFICATE HAS BEEN VERIFIED, THAT THE TARGET STATUS INFORMATION HAS BEEN VERIFIED

S205

DETERMINING, IN CASE WHERE ANY CERTIFICATE HAS NOT BEEN VERIFIED, THAT THE TARGET STATUS INFORMATION HAS NOT BEEN VERIFIED

FIG. 2

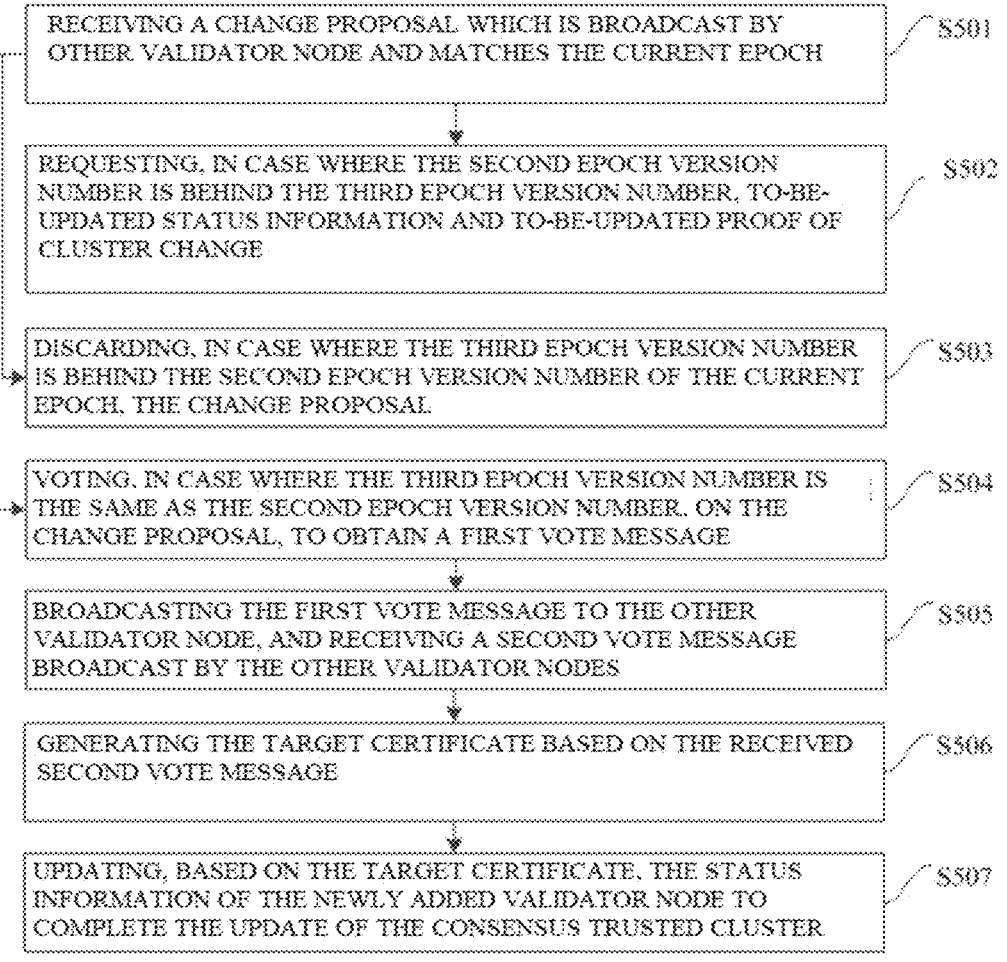

RECEIVING A CHANGE PROPOSAL WHICH IS BROADCAST BY OTHER VALIDATOR NODE AND MATCHES THE CURRENT EPOCH — S501

REQUESTING, IN CASE WHERE THE SECOND EPOCH VERSION NUMBER IS BEHIND THE THIRD EPOCH VERSION NUMBER, TO-BE-UPDATED STATUS INFORMATION AND TO-BE-UPDATED PROOF OF CLUSTER CHANGE — S502

DISCARDING, IN CASE WHERE THE THIRD EPOCH VERSION NUMBER IS BEHIND THE SECOND EPOCH VERSION NUMBER OF THE CURRENT EPOCH, THE CHANGE PROPOSAL — S503

VOTING, IN CASE WHERE THE THIRD EPOCH VERSION NUMBER IS THE SAME AS THE SECOND EPOCH VERSION NUMBER, ON THE CHANGE PROPOSAL, TO OBTAIN A FIRST VOTE MESSAGE — S504

BROADCASTING THE FIRST VOTE MESSAGE TO THE OTHER VALIDATOR NODE, AND RECEIVING A SECOND VOTE MESSAGE BROADCAST BY THE OTHER VALIDATOR NODES — S505

GENERATING THE TARGET CERTIFICATE BASED ON THE RECEIVED SECOND VOTE MESSAGE — S506

UPDATING, BASED ON THE TARGET CERTIFICATE, THE STATUS INFORMATION OF THE NEWLY ADDED VALIDATOR NODE TO COMPLETE THE UPDATE OF THE CONSENSUS TRUSTED CLUSTER — S507

FIG. 5

CONSENSUS TRUSTED CLUSTER CHANGING METHOD, COMPUTER DEVICE AND COMPUTER-READABLE STORAGE MEDIUM

CROSS-REFERENCE TO RELATED APPLICATIONS

The disclosure claims the benefit of Chinese Patent Application No. 202211119799.7 filed on Sep. 15, 2022, and the entire contents of which are incorporated herein by reference.

TECHNICAL FIELD

The present disclosure relates to the technical field of blockchain, and more particularly, relates to a consensus trusted cluster changing method, a computer device and a computer-readable storage medium.

BACKGROUND

A consensus trusted cluster of a blockchain can be used to guarantee the consistency of the blockchain. The consensus trusted cluster may include multiple validator nodes, which may achieve a trusted synchronization target status.

In case where the validator nodes in the consensus trusted cluster have changed, for the existing validator nodes, the update of the system status made by the current verifier cluster is trusted, but for the newly added or lagging validator nodes, it is difficult to determine a trusted synchronization target status after several changes in the cluster configuration of the blockchain system.

During status synchronization, the newly added or lagging validator nodes need to verify each status change of the consensus trusted cluster during the status synchronization. Therefore, the validity of the status to be synchronized cannot be determined prior to the status synchronization.

SUMMARY

In view of this, the embodiments of the disclosure provide a consensus trusted cluster changing method, a computer device and a computer-readable storage medium, for determining a trusted target status information prior to the status synchronization.

A first aspect of the embodiments of the disclosure provides a consensus trusted cluster changing method applicable to a blockchain, the changing method includes:

determining a current epoch of a newly added validator node of the consensus trusted cluster in the blockchain and a target epoch of the consensus trusted cluster;

requesting target status information and proof of target cluster change from a target validator node in the target epoch;

verifying the target status information according to the proof of target cluster change; and updating, in case where the target status information has been verified, status information of the newly added validator node according to the target status information to complete change of the consensus trusted cluster.

A second aspect of the embodiments of the disclosure provides a computer device, which includes a memory, a processor and a computer program stored in the memory and executable on the processor. When executing the computer program, the processor implements the changing method according to the first aspect.

A third aspect of the embodiments of the disclosure provides a computer-readable storage medium storing a computer program. When executed by a processor, the computer program implements the changing method according to the first aspect.

Compared with prior art, the embodiments of the disclosure have the following advantages:

In the embodiments of the disclosure, when the status of the consensus trusted cluster changes, the current epoch of the newly added validator node is behind the cluster epoch of other validator nodes in the consensus trusted cluster. In order to synchronize the cluster status, the validator node may determine a target epoch higher than the current epoch, and then request the target status information and the proof of the target cluster change from the target validator node in the target epoch. Based on the proof of target cluster change, the validator node may verify the target status information. In case where the target status information has been verified, it indicates that the target status information is correct, and the validator node may synchronize the cluster status according to the target status information, so as to realize the change of the consensus trusted cluster in the validator node. The validator node in the embodiments of the disclosure includes the proof of cluster change corresponding to the cluster status. Therefore, during the status synchronization, the newly added verifier node may first verify the cluster status according to the proof of cluster change, so as to determine the trusted target cluster status. Synchronization based on the trusted target cluster status may avoid invalid status synchronization of the newly added verifier node.

BRIEF DESCRIPTION OF THE DRAWINGS

In order to more clearly explain the technical solutions in the embodiments of the disclosure, the following provides a brief description of the attached drawings necessary in the embodiments or in the prior art.

FIG. 1 is a schematic step flow chart of a consensus trusted cluster changing method provided by the embodiments of the disclosure;

FIG. 2 is a schematic flow chart of verify the proof of target cluster change provided by the embodiments of the disclosure;

FIG. 5 is a schematic step flow chart of another consensus trusted cluster changing method provided by the embodiments of the disclosure;

DETAILED DESCRIPTION OF THE EMBODIMENTS

Figure 3:
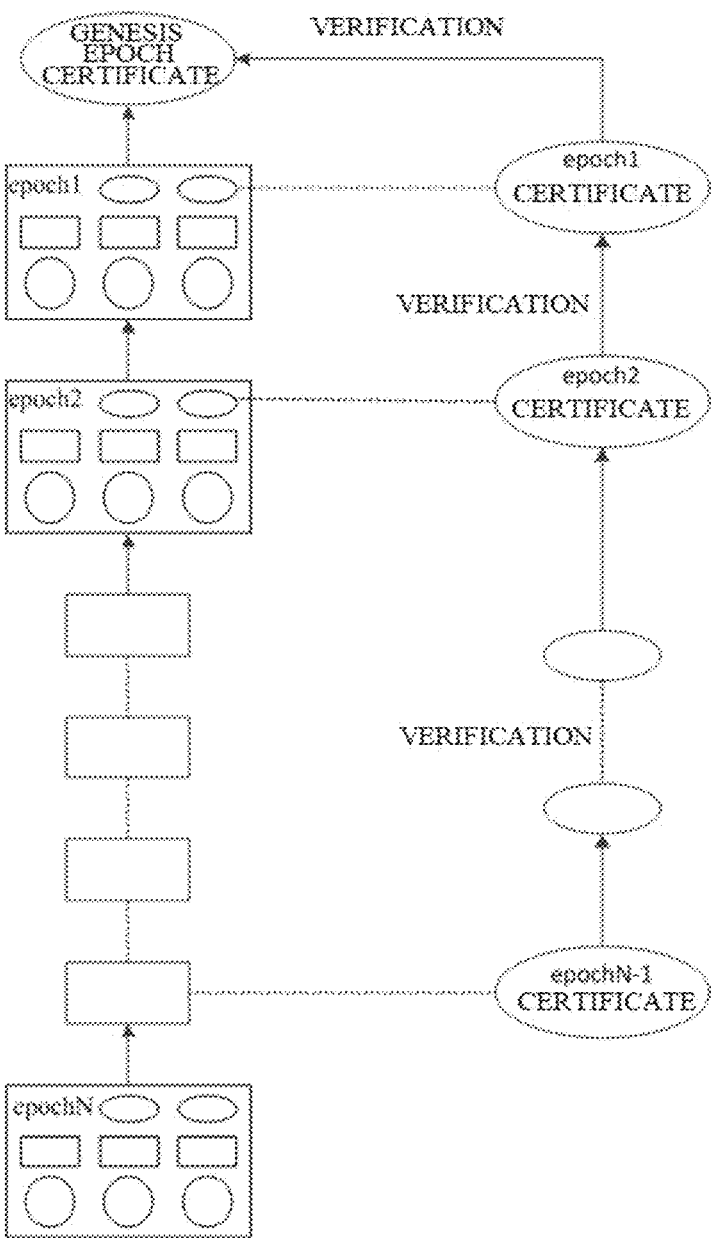
FIG. 3 is a basic structure chart of the verification provided by the embodiments of the disclosure.

In the following description, specific details such as the particular system structure, technology, etc. are presented for illustration rather than limitation in order to facilitate a thorough understanding of the embodiments of the disclosure. It is understood by those skilled in the art, however, that this disclosure may also be realized in other embodiments without such specific details. In other cases, detailed descriptions of well-known systems, devices, circuits, and methods are omitted to avoid unnecessary details from obstruct the description of the disclosure.

It should be understood that, when used in the description and the accompanying claims of the disclosure, the term "includes" indicates the existence of the described feature, piece, step, operation, element and/or component, but does not preclude the existence or addition of one or more other features, pieces, steps, operations, elements, components and/or groups thereof.

It should also be understood that the term "and/or" as used in the description and the accompanying claims of the disclosure refers to any combination of one or more of the listed related items and all possible combinations thereof, and includes such combinations.

As used in the description and the accompanying claims of the disclosure, the term "if" may be construed in the context as "when . . . " or "once" or "in response to determination" or "in response to detection". Similarly, the phrases "if determined" or "if detected [described condition or event]" may be construed as, depending on the context, "once determined" or "in response to determination" or "once detected [described condition or event]" or "in response to detection of [described condition or event]".

In addition, in the description and the accompanying claims of the disclosure, the terms "first", "second", "third", etc., are used only to distinguish the description and cannot to be construed as indicating or implying a relative importance.

Reference to "one embodiment" or "some embodiments" and etc. as described in the description of the disclosure implies that one or more embodiments of the disclosure include the particular feature, structure or characteristic described in combination with the embodiment. Thus, the statements "in one embodiment", "in some embodiments", "in some other embodiments", "in some further embodiments", etc. appearing in different parts of the description do not necessarily all refer to the same embodiments, but mean "one or more but not all embodiments", unless otherwise specifically emphasized. The terms "include", "comprise", "have" and their variations all mean "include but not limited to", unless otherwise specifically emphasized.

Trust of blockchains is currently based mainly on trust of the signature of the validator node for the Genesis cluster configuration and the latest cluster configuration. In operation of the consensus protocol, the validator node in the consensus trusted cluster signs the block proposed by the consensus. After validity verification of this block has been performed by other validator nodes, this block is considered to have correctly passed the consensus and is submitted and linked up. The consensus trusted cluster may be changed, such as have a validator node added or deleted.

Taking the current Byzantine Fault Tolerant (BFT) consensus algorithm as an example, the changing solution of the consensus trusted cluster is described as follows: the validator node packages a transaction containing the cluster change information, generates a change proposal, and then sends the signed proposal block to the remaining validator nodes. After receiving the proposal block, the other validator nodes verify information such as the signature of the packaging validator node, the correctness of the transaction, the execution result, and attach their own voting signature information after the verification information is correct. When each validator node collects quorum signatures specified by the old cluster configuration, it submits this block and updates the cluster configuration to complete the cluster change. Starting with a next proposal after the cluster change, the validator node uses the new cluster configuration to verify the validity of the consensus message.

When a new validator node of the cluster joins, the new validator node trusts the latest status of the latest cluster configuration validator nodes and sets this status as the target synchronization status, and sends a block pull request to the validator nodes in the cluster. The new validator node verifies the correctness of each cluster change by executing the blocks in sequence one by one from the block which is obtained by successive synchronization from the Genesis block. That is, assuming that the cluster configuration in the status of block Bk is still the Genesis cluster configuration V1, block Bk+1 contains the transaction changing the cluster status, and the status after the execution changes the cluster configuration to V2, at this time, if block Bk+1 contains the correct verification information in V1 and may be successfully executed correctly, the operation of changing the cluster configuration to V2 is considered valid. Having executed all the blocks, the new validator node reaches the latest consensus status, updates the consensus cluster configuration information with the latest status, and then starts the consensus proposal and voting process.

The above solution may realize the change of the consensus cluster configuration and the joining of new nodes after the change, but there is still the following problem: the validator nodes information required by the proposal block is unclear. When receiving a proposal block, each validator node only uses the validator node list in its own view to judge whether the proposal is valid and whether the collected validator node signatures have a quorum. However, the validator node may be in an inconsistent or lagging view status, and the validator node information may be incorrect. In addition, it is difficult to determine the target status when a new validator node is joined. It is difficult for the node to verify the correctness of the target status before the synchronization, and errors can only be found during the synchronization. Assuming the following situation: a system S has actually V cluster nodes after n cluster changes, and needs to obtain the latest status information in the cluster, namely the block height, the block hash, and the cluster information, after the new node w has joined. However, to ensure that the status found by w is correct, w needs to query at least f+1 nodes for consistency block status and cluster information. If V=1000, w needs to query the status of at least 334 nodes. Obviously, this approach is cumbersome and even difficult to implement, because the new node w may not be able to connect to so many nodes. However, if the node directly trusts the status of a node and triggers the synchronization, it may find that the target status is wrong during the synchronization, causing the previous work invalid. In addition, this solution needs to verify the certificate of each block during the synchronization, which is costly. Since the validator node list may change due to the execution of a block during the synchronization, and this change cannot be known in advance, the node must verify whether the certificate of each block is valid under the validator node list of the current status during the synchronization.

In view of this, the disclosure provides a consensus trusted cluster changing method, so that the change behavior of the consensus trusted cluster can be verified and traced in the process of consensus. The technical solutions of the disclosure are illustrated with specific embodiments below.

Refer to FIG. 1, which shows a schematic step flow chart of a consensus trusted cluster changing method provided by the embodiments of the disclosure, which may specifically include the following steps:

S101, determining the current epoch of a newly added validator node of the consensus trusted cluster in the blockchain and the target epoch of the consensus trusted cluster.

The execution body of the embodiment is the blockchain, which has a consensus trusted cluster. The consensus trusted cluster of the blockchain may include a plurality of validator nodes, and the change of the consensus trusted cluster may include the addition and deletion of a validator node. Each validator node in the consensus trusted cluster needs to maintain consistency status, so when a new validator node joins the consensus trusted cluster, the status of each original validator node changes to reach the latest status; the new validator node is synchronized to the latest status of the blockchain. The embodiment illustrates the method in the embodiment by taking a newly added validator node that newly joins the consensus trusted cluster as the execution body. The change of the consensus trusted cluster on the validator node is embodied by the validator node synchronizing the current status of the consensus trusted cluster.

Each validator node in the consensus trusted cluster may record the cluster epoch which the verifier is at, and the cluster epoch may be used to identify the version of the consensus trusted cluster in which the validator node is located. Each time the consensus trusted cluster undergoes a cluster change, the version is updated once. To identify the version which it is at, the validator node may record the corresponding epoch version number. The epoch version number may have a corresponding epoch rule, and the epoch which the validator node is at may be determined according to the epoch version number.

The above-mentioned current epoch is the cluster epoch which the newly added validator node is at. The validator node may determine the current epoch of the validator node by reading its own stored epoch version number. The above-mentioned target epoch may be the latest cluster epoch of the consensus trusted cluster. For the newly added validator node, the epoch version number of the current epoch is behind the epoch version number of the target epoch.

In one possible implementation, the initial value of the epoch version number may be 1, and the epoch version number will be increased by one each time the consensus trusted cluster changes. When the epoch version number is 1, the consensus trusted cluster is the Genesis cluster, and after a new validator node joins the Genesis cluster, the consensus trusted cluster updates the epoch version number to 2 after the change. The epoch version number of the newly added validator node may be 1, that is, the status of the newly added validator node is the initial status of the consensus trusted cluster.

In one possible implementation, the newly added validator node may receive a message sent by another validator node in the consensus trusted cluster, and this message may carry the epoch version number of another validator node. The newly added validator node may determine the latest epoch version number from the received message, and determine the cluster epoch corresponding to this latest epoch version number as the above-mentioned target epoch. That is, the target epoch may be the latest cluster epoch considered by the newly added validator node.

S102, requesting the target status information and the proof of target cluster change from the target validator node in the target epoch.

The above-mentioned target validator node is the target validator node in the target epoch in the consensus trusted cluster. The cluster status of the newly added validator node is behind the cluster status of the target validator node, so the status information of the newly added validator node needs to be updated according to the status information of the target validator node. The status information of the target validator node is the above-mentioned target status information.

The newly added validator node may send a cluster status request information to the target validator node to request the target status information and the proof of target cluster change from the target validator node. The proof of target cluster change is used to verify whether the target status information is correct.

S103, verifying the target status information according to the proof of target cluster change.

The above-mentioned proof of target cluster change may include the proof information of each cluster change of the consensus trusted cluster. According to the proof information, it is possible to determine whether the corresponding cluster change is valid. If, according to the proof information, it is determined that each cluster change in the process of updating the consensus trusted cluster to the target epoch is valid, the target status information may be determined to have been verified. If any cluster change is not valid, then it is determined that the target status information has not been verified.

In one possible implementation, the proof information may be a certificate. When the consensus trusted cluster changes, the validator node in the consensus trusted cluster will generate a certificate and add the certificate to a certificate list of the proof of cluster change. The certificate may be used to determine whether this status update of the validator node is valid. The certificate list, composed of the certificates generated each time the consensus trusted cluster changes, is stored in the proof of cluster change. The newly added validator node may verify the certificates, and the target status information may be considered to be trusted when all the certificates have been verified.

In another possible implementation, the above-mentioned proof information may be an administrator confirmation information when the cluster changes. The blockchain may have a corresponding administrator, and when the consensus trusted cluster changes, the cluster change information may be sent to this administrator for confirmation. After the administrator confirms the cluster change, the administrator may send the confirmation information to each validator node of the consensus trusted cluster. The validator nodes store the received confirmation information in the proof of cluster change as the proof information of the cluster change. The newly added validator node may determine whether each cluster change is correct according to the multiple confirmation information in the proof of target cluster change.

S104, updating, in case where the target status information has been verified, the status information of the newly added validator node according to the target status information to complete the change of the consensus trusted cluster.

If the target status information has been verified, the target status information may be considered to be trusted, and the newly added validator node may update its own status information according to the target status information.

In one possible implementation, the newly added validator node may synchronize the block height and hash corresponding to the target status information as the target status and execute the block. After the synchronization is complete, the consensus cluster configuration information is updated with the latest status, and then the consensus proposal and the voting process may begin.

In another possible implementation, the newly added validator node may directly pull the status tree of the target validator node through the target status information to be updated to the latest cluster status.

In this embodiment, the status synchronization of a lagging validator node is described by taking a newly added validator node as the execution body. It should be understood by those skilled in the art that any lagging validator node in a consensus trusted cluster may use the method of this embodiment to perform the synchronization of the cluster status. It is possible for the lagging validator node in the embodiment to obtain an explicit target status through verification during the status synchronization. The lagging validator node verifies the proof of historical cluster changes prior to the synchronization, which ensures the correctness of the synchronization target and facilitates selection of the target validator node.

In this embodiment, the newly added validator node of the consensus trusted cluster may request the target verification information and the proof of target cluster change from the target validator node in the target epoch when synchronizing the status of the consensus trusted cluster. Through the proof of target cluster change, the newly added validator node may determine whether the target status information is trusted. The newly added validator node may verify the trusted target status prior to the status synchronization, which avoids invalid synchronization resulted from the errors found during the synchronization. In addition, since the certificate in the proof of cluster change has been verified prior to the status synchronization, the target status information is guaranteed to be correct, and the certificate of each block does not need to be verified for monitoring the cluster change after the execution of the block. Since the newly added validator node does not need to verify the certificate of each block after the status synchronization, the computing resource consumption during the status synchronization is small.

Refer to FIG. 2, which shows a schematic flow chart of verifying the proof of target cluster change provided by the embodiments of the disclosure, which may include the following steps:

S201, obtaining the certificate list in the proof of target cluster change, where the certificate list includes one or more certificates.

The execution body of the embodiment is the newly added validator node in the consensus trusted cluster.

The above certificate may be shown as follows:

---
Epoch-EndingQuorumCert
---

BlockHash (block hash)
BlockHeight (block height)
Epoch (epoch version number)
QuorumSignatures (signature information)
<NextEpochState> (next epoch information)
<OtherField> . . .

---

The Epoch (epoch version number) above is used to represent the cluster epoch in which the certificate was generated. Each certificate has a corresponding epoch version number. Based on the epoch version number, each certificate has a certain position in the certificate list. The above <NextEpochState>(next epoch information) includes a next epoch verifier list, that is, the validator list of a next cluster epoch of the corresponding epoch of the epoch version number of the certificate. A hash value may be calculated based on the above certificate, and the hash value may be signed to obtain the above QuorumSignatures (signature information).

S202, determining each certificate and the verification information corresponding to each certificate.

When performing the verification, each certificate needs to be verified according to the verification information of each certificate, so the verification information needs to be determined. A first certificate which is the one listed first is determined and the validator list of the newly added validator node is taken as the verification information of the first certificate. The validator list of the newly added validator node may include the public key information of each validator node in the consensus trusted cluster under the current epoch of the newly added validator node.

Regarding a second legal certificate, a previous certificate of the second legal certificate is determined, and the validator list of the previous certificate is taken as the verification information of the second legal certificate, where the second certificate is any certificate listed other than first in the certificate list. The validator list of the certificate is the above-mentioned next epoch validator list in the <NextEpochState>(next epoch information). Since the validator list stored in each certificate is the next epoch validator list, the verification of the second certificate needs to obtain the validator list of the previous certificate when performing the verification.

S203, verifying each certificate respectively by using the verification information.

Determine, for any certificate, the validator list, the hash value of the certificate and the signature information of the certificate corresponding to the verification information of the certificate, where the validator list corresponding to the verification information of the certificate includes the public keys of the plurality of validator nodes in the consensus trusted cluster. Verify the signature information according to the public keys and the hash value. Determine, in case where the signature information has been verified, that the certificate has been verified. In this case, the hash value is obtained by hashing all parts of the certificate structure except the signature information, and the signature information is the signature to the hash value. Based on the agreed signature and signature verification method of the consensus trusted cluster, the newly added validator node may perform the signature verification based on the public keys in the validator list.

S204, determining, in case where each certificate has been verified, that the target status information has been verified.

In case where all the certificates in the certificate list have been verified, the target status information may be determined to be trusted.

S205, determining, in case where any certificate has not been verified, that the target status information has not been verified.

In case where a certificate has not been verified, the target status information may be determined to have not been verified.

In one possible implementation, it is possible to verify a plurality of certificates in parallel based on the determined verification information of each certificate. In case where one certificate has not been verified, the target status information verification is determined to be not passed.

In one possible implementation, since the verification of the certificate requires the participation of a certificate of a previous epoch of the certificate, the verification of the certificates may be carried out sequentially. After the previous epoch certificate has been verified, the verification of the next epoch certificate is carried out. In case where one certificate has not been verified, the corresponding epoch version number of the certificate may be determined, so that the position of the error in the target status information may be determined.

FIG. 3 is a basic structure chart of the verification provided by the embodiments of the disclosure. The consensus trusted cluster will generate a corresponding certificate every time the cluster changes, and the verification of each certificate requires the participation of a previous certificate. As shown in FIG. 3, the Genesis cluster configuration of the consensus trusted cluster may have a Genesis certificate in which epoch=0. When the consensus trusted cluster changes from epoch1 to epoch2, a corresponding epoch1 certificate will be generated. In the epoch1 certificate, epoch=1. When the consensus trusted cluster changes from epoch2 to epoch3, a corresponding epoch2 certificate will be generated. In the epoch2 certificate, epoch=2. When the consensus trusted cluster changes from epochN−1 to epochN, a corresponding epochN−1 certificate will be generated. In the epochN−1 certificate, epoch=N−1.

Figure 4:
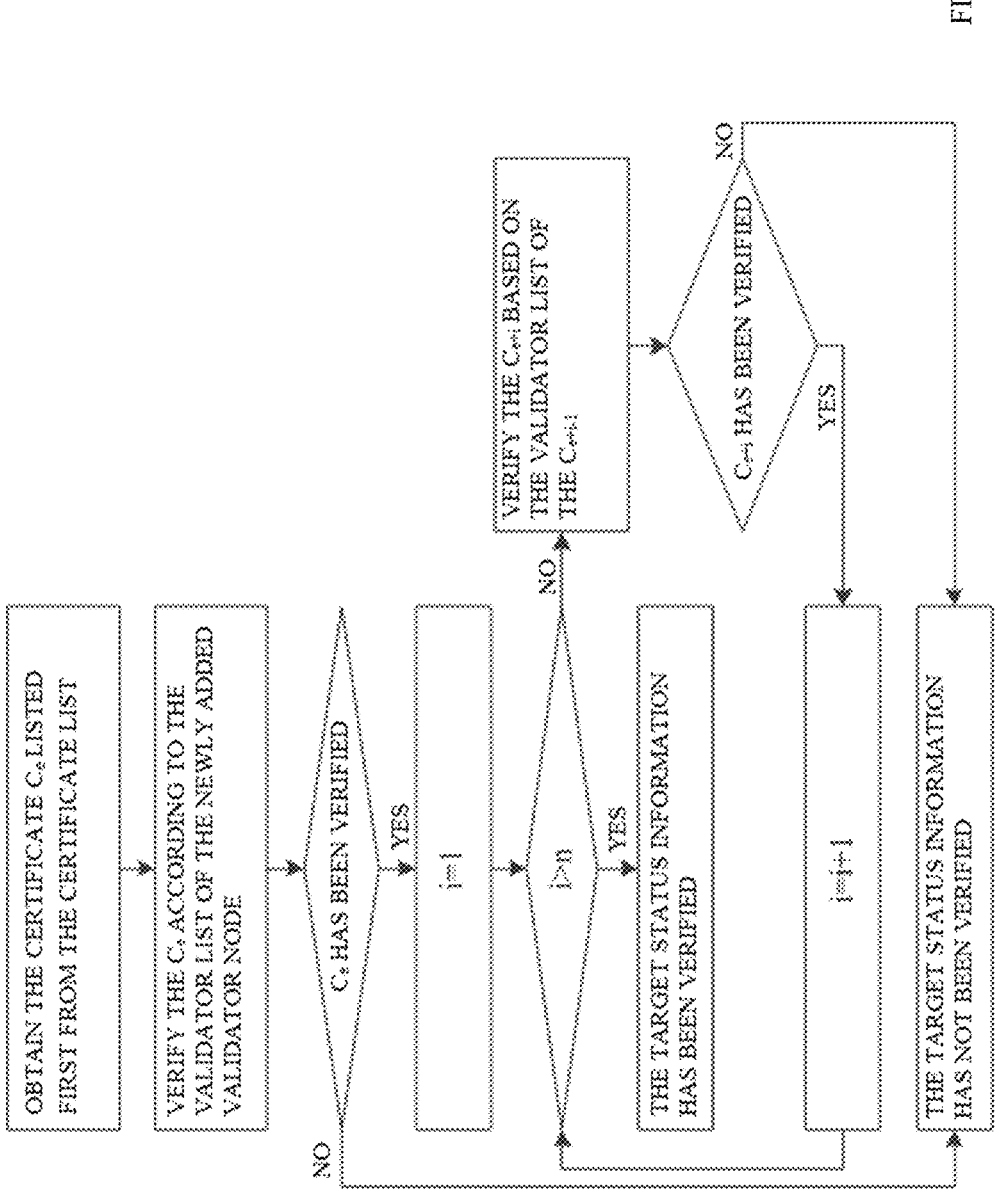
FIG. 4 is a flow chart of verifying a certificate list provided by the embodiments of the disclosure.

FIG. 4 is a flow chart of verifying a certificate list provided by the embodiments of the disclosure. In the verification shown in FIG. 4, it is assumed that the current epoch of the newly added validator node is e and the target epoch is e+n+1. Then the Proof which is the proof of historical cluster changes, contains n certificates between epochs e and e+n:

$$\text{Proof} = \{C_i\}_{i=e}^{n} = \{C_e, C_{e+1}, \ldots, C_{e+n}\} \mid e > 0$$

The validator list of the newly added validator node is $\text{CurrentVSet}_e$. Because the newly added validator node just joined the consensus trusted cluster, $\text{CurrentVSet}_e$ is the verifier configured in the Genesis block, where:

$$\text{CurrentVSet}_e = C_{e-1}.VSet \mid e > 0$$

As shown in FIG. 4, it is possible to obtain the certificate $C_e$ listed first from the certificate list, and then verify the $C_e$ according to the validator list of the newly added validator node, that is:

$$\text{verify}(Ce) = \text{CurrentVSet}_e.\text{verify }(Ce.Hash, Ce.Signatures)$$

Where, verify $(C_e)$ represents verifying the $C_e$, $\text{CurrentVSet}_e$·verify $(C_e.\text{Hash}, C_e.\text{Signatures})$ represents verifying the $C_e$ according to the hash value and the signature information of the validator list $\text{CurrentVSet}_e$ of the newly added validator node and the certificate $C_e$.

In case where the $C_e$ has been verified, then proceed with i=1. Determine whether i is greater than n. In case where i is greater than n, determine that all certificates in the certificate list have been verified, that is, the target status information has been verified. In case where i is less than or equal to n, verify the $C_{e+1}$ based on the validator list of the $C_{e+i-1}$. In case where the $C_{e+i}$ has been verified, set i=i+1 and continue the verification from the step of determining whether i is greater than n. In case where the $C_{e+i}$ has not been verified, determine that the target status information has not been verified.

In case where the $C_e$ has not been verified, determine the target status information to have not been verified.

The verification of other certificates than the $C_e$ in the certificate list is:

$$\text{verify}(Cx) = C_{x-1}.VSet.\text{verify }(Cx.Hash, Cs.Signatures) \mid C_x \in \{C_i\}_{i=e+1}^{n-1}$$

Where, Ci−1·VSet is the validator list of the certificate Ci−1. The above equation means that the verification of the certificate Ci is based on the validator list of the Ci−1, the signature value of Ci and the information of the verifier.

In case where all certificates in the certificate list have been verified, the proof of cluster change has been verified. That is:

$$\text{verify}(\text{Proof}) = \text{verify}(C_e) \wedge \text{verify}(C_x)$$

In this embodiment, the verification of the certificate may be independent of the synchronization of the cluster status. The next epoch validator list may be stored in the certificate, so that the newly added validator node may verify the certificate according to a certificate of a previous epoch according to the certificate.

Refer to FIG. 5, which shows a schematic step flow chart of another consensus trusted cluster changing method provided by the embodiments of the disclosure, which may specifically include the following steps:

S501, receiving a change proposal which is broadcast by other validator node and matches the current epoch.

The execution body of this embodiment is the newly added validator node. In this embodiment, the newly added validator node has joined the consensus trusted cluster through the steps S101-S104, and may perform consensus and voting in the consensus trusted cluster. Now the newly added validator node may be equivalent to an existing validator node in the consensus trusted cluster.

When the consensus trusted cluster of the blockchain needs change, it may send a valid change information or submit a change transaction to a validator node in the current consensus trusted cluster. The validator node may create a change proposal according to the received change information or change transaction, and broadcast the change proposal to each validator node in the consensus trusted cluster. Each validator node may process the received change proposal to realize the change of the consensus trusted cluster. Of course, in case where the newly added validator node receives the change information regarding the consensus trusted cluster from the administrator after having realized the status synchronization with the consensus trusted cluster, it will create a target change proposal based on the change information, to broadcast the target change proposal to each validator node in the consensus trusted cluster.

The change proposal may be a block as shown in the following:

| Block |
|---|
| ParantHash (parent hash) |
| BlockHeight (block height) |

-continued

| Block |
| --- |
| Epoch (epoch version number) |
| Auther (submitter) |
| Signature (signature information) |
| Transactions (transaction information) |
| <OtherField> . . . |

Where the Epoch (epoch version number) may be the epoch version number when the validator node created the proposal.

The newly added validator node may receive the change proposal broadcast by other validator node and determine the epoch version number of the change proposal. To facilitate the description, the epoch version number of the change proposal is referred to as the third epoch version number.

S502, requesting, in case where the second epoch version number is behind the third epoch version number, to-be-updated status information and to-be-updated proof of cluster change from the validator node that sent the change proposal, to update the status information of the newly added validator node according to the to-be-updated status information after the to-be-updated proof of cluster change has been verified.

The above-mentioned second epoch version number is the epoch version number of the newly added validator node. If the second epoch version number is behind the third epoch version number, it means that the cluster status of the newly added validator node is behind that of the source node where the change proposal was from. In this case, it is possible to send a cluster status request information to the source node of the change proposal to obtain the to-be-updated status information and the to-be-updated proof of cluster change returned by the source node of the change proposal. Then adopt the solutions in S101-S104, to update the status information of the newly added validator node according to the to-be-updated status information and the to-be-updated proof of cluster change.

S503, discarding, in case where the third epoch version number is behind the second epoch version number of the current epoch, the change proposal.

If the third epoch version number is behind the second epoch version number, it means that the newly added validator node has already undergone a cluster change represented by the change proposal. In this case the change proposal may be discarded without processing.

S504, voting, in case where the third epoch version number is the same as the second epoch version number, on the change proposal, to obtain a first vote message.

If the third epoch version number is the same as the second epoch version number, it means that the cluster change represented by the change proposal is a cluster change under the current epoch of the newly added validator node. The current epoch refers to the cluster epoch in which the newly added validator node received the change proposal.

The newly added validator node may vote on the change proposal based on the information carried in the change proposal and generate the vote message. The vote message may include the epoch version number of the newly added validator node, i.e., the second epoch version number.

S505, broadcasting the first vote message to the other validator node of the consensus trusted cluster, and receiving a second vote message broadcast by the other validator nodes.

Each validator node in the consensus trusted cluster may generate a vote message when it receives a change proposal that matches its own current epoch, and broadcast the vote message to the other validator nodes in the cluster. That is, the newly added validator node may broadcast the generated first vote message to other validator nodes in the consensus trusted cluster, and receive the second vote message broadcast by other validator nodes. The second vote message includes the epoch version number of other validator nodes, which is referred to as the first epoch version number.

S506, generating the target certificate based on the received second vote message.

Determine, from the received second vote message, the number of the second vote messages whose first epoch version number is the same as the second epoch version number of the current epoch. Generate, in case where the number reaches a first preset value, the target validator list according to the existing validator nodes in the consensus trusted cluster. Generate, according to the target validator list, the target certificate, where the epoch version number of the target certificate is the same as the second epoch version number.

In one possible implementation, the vote message may carry the vote result of the validator node on the change proposal. After having obtained the preset number of second vote messages with the same first epoch version number as the second epoch version number, the newly added validator node may determine whether the change proposal is approved based on the vote result in the vote messages and the vote rules in the consensus trusted cluster. In case where the change proposal is not approved, the consensus trusted cluster will change. In case where the change proposal is approved, it may be determined that the validator node is included in the consensus trusted cluster under the cluster epoch corresponding to the second epoch version number. Based on the public keys of these validator nodes, a validator list is generated, which votes on the process that the consensus trusted cluster changes from the current epoch to the next epoch, and is the validator list of the next epoch, that is, the validator list should be in the <NextEpochState> of the target certificate.

S507, updating, based on the target certificate, the status information of the newly added validator node to complete the update of the consensus trusted cluster.

The newly added validator node may update the validator list of the newly added validator node to the target validator list, and update the epoch version number of the newly added validator node and other configuration information of the cluster, so as to complete the change of the consensus trusted cluster in this validator node.

After the generation of the target certificate, the newly added validator node may add the target certificate to the proof of cluster change of the newly added validator node. When receiving a cluster status request information from other validator node, the newly added validator node may return the updated status information and proof of cluster change to the corresponding source node of the cluster status request information. The source node may verify the status information according to the proof of cluster change, and synchronize the status information after the verification has been passed. For the specific verification and synchronization, one may refer to S101-S104 and S201-S205, which will not be repeated here.

This embodiment takes the newly added validator node as the execution body to illustrate the status information update process in the existing validator nodes in the cluster when the consensus trusted cluster changes. Those skilled in the art should understand that, in case where a new validator node joins the consensus trusted cluster, and results in a change in the consensus trusted cluster, the existing validator nodes in the consensus trusted cluster may update their own cluster status information through the steps of S501-S507.

In this embodiment, when the consensus trusted cluster is updated, the existing validator nodes in the consensus trusted cluster may generate certificates while the cluster changes, and the certificate list may include the next epoch validator list, so that the certificate of the next epoch may be verified. The certificate may be added to the proof of cluster change. When other validator nodes request the cluster synchronization information, the proof of cluster change may be sent to other validator nodes to facilitate other validator nodes to perform verification according to the steps in S101-S104, so that the validator node may avoid invalid verification during the status synchronization. The certificate list may include a next epoch validator list, so that the certificate of next epoch may be verified.

In the embodiments of the disclosure, the epoch version number of the current consensus trusted cluster is specified in each block of change proposal. It is possible to determine the validator nodes that need to vote on the change proposal according to the epoch version number.

It should be noted that the sequence number of each step in the above embodiments does not mean the order of execution, and the order of execution of each process shall be determined by its function and internal logic, and shall not constitute any limitation on the implementation of the embodiments of the disclosure.

Figure 6:
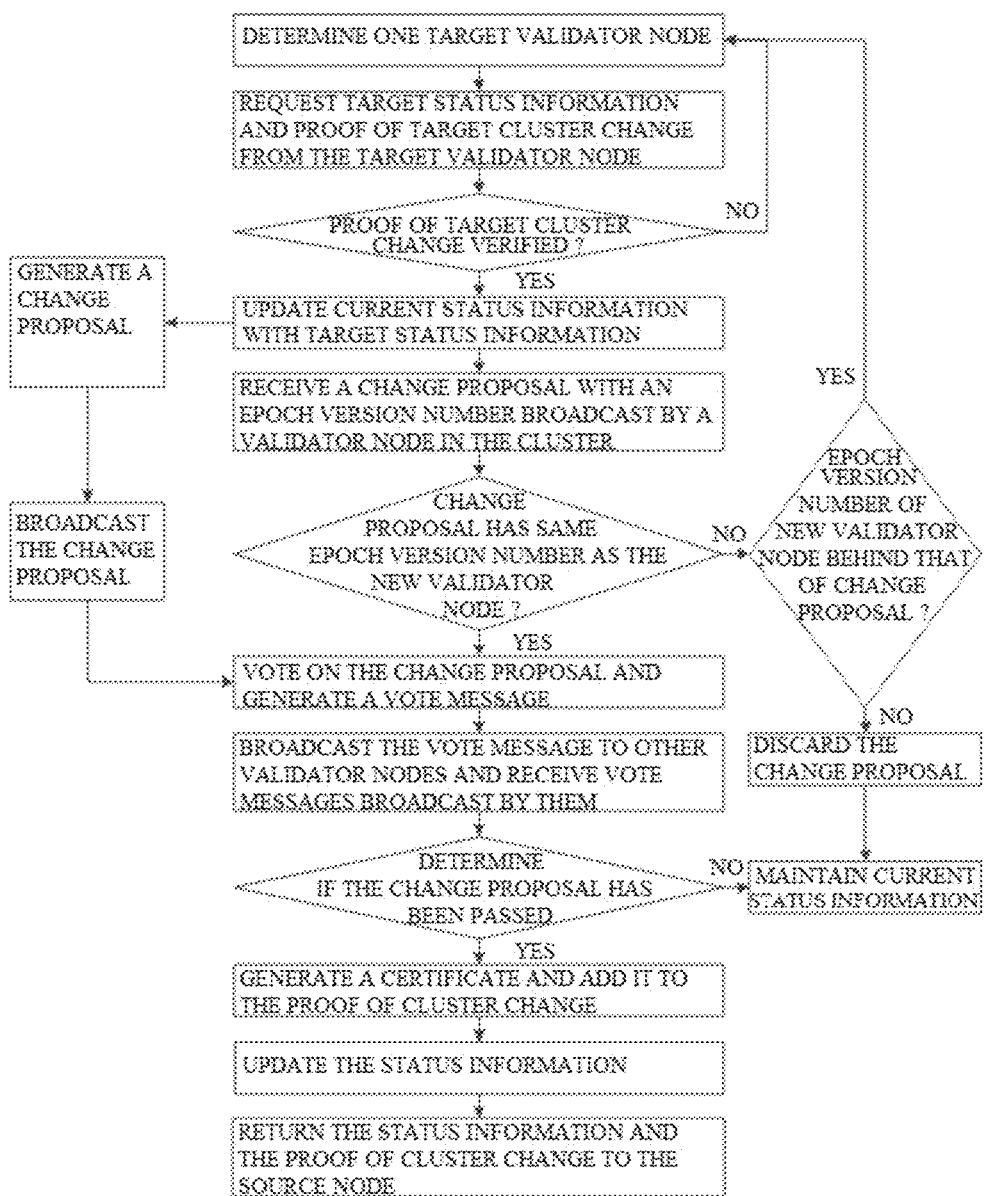
FIG. 6 is a schematic step flow chart of a further consensus trusted cluster changing method provided by the embodiments of the disclosure.

In order to better explain the solutions in the disclosure, FIG. 6 illustrates the consensus trusted cluster changing method in the disclosure through the update process of the status information of a newly added validator node joining the consensus trusted cluster.

When a new validator node is added in the consensus trusted cluster, it may send a validator node in the existing consensus trusted cluster a change information, such as the certificate information of the newly added node, the address of the newly added node, and the administrator information of the newly added node. This validator node may be the primary validator node. Based on the received change information, the primary validator node in the consensus trusted cluster may generate a change proposal. After generating the change proposal, the primary validator node may broadcast the change proposal to each validator node in the blockchain. After receiving the change proposal, each validator node may first determine the cluster epoch of the change proposal. In case where the cluster epoch is consistent with the cluster epoch of the validator node, the validator node may vote on the change proposal according to the information of the newly added node, and generate a vote message according to the vote result. The vote message includes the current cluster epoch and the signature information of the voting validator node. After the generation of the vote message, each validator node may broadcast the vote message to each validator node in the blockchain.

The validator node may receive the vote messages broadcast by other validator nodes. Based on the received vote messages and the vote rules agreed upon by the blockchain, the validator node may determine whether the change proposal has been passed. If the change proposal has been passed, the consensus trusted cluster changes. At this point, the existing validator nodes of the consensus trusted cluster may update the cluster status. The newly added validator node may join in the consensus trusted cluster to start performing the steps shown in FIG. 6.

The newly added validator node may determine one target validator node, which may be a validator node in the latest cluster status, or may be a validator node that is not in the latest cluster status. The cluster status of the target validator node is ahead of the cluster status of the newly added validator node.

The newly added validator node may request the target status information and the proof of target cluster change from the target validator node.

After receiving the target status information and the proof of target cluster change from the target validator node, the newly added validator node may verify the proof of target cluster change and determine whether the proof of target cluster change has been verified. If the proof of target cluster change has not been verified, the newly validator node ma re-determine a new target validator node and continue to request new target status information and proof of target cluster change.

If the proof of target cluster change has been verified, the current status information may be updated according to the target status information to achieve the updated cluster status.

After joining the consensus trusted cluster, the newly added validator node may receive a change proposal broadcast by a validator node in the cluster. The change proposal has an epoch version number, and the newly added validator node also has an epoch version number.

The newly added validator node may determine whether the epoch version number of the change proposal is the same as the epoch version number of the newly added validator node.

If the two are the same, it means that the newly added validator node is in the same cluster epoch as the change proposal, and it is possible to vote on the change proposal and generate a vote message, and broadcast the vote message to other validator nodes and receive vote messages broadcast by other validator nodes. Determine whether the change proposal has been passed according to the received vote messages. In case where the change proposal has not been passed, the consensus trusted cluster does not change. In case where the change proposal has been passed, a certificate may be generated, and then the certificate may be added to the proof of cluster change. The status information of the newly added validator node may then be updated, and the newly added validator node achieves the updated cluster epoch. That is, the epoch version number of the newly added validator node is updated.

If the two are different, it is possible to determine whether the epoch version number of the newly added validator node is behind the epoch version number of the change proposal. In case where the epoch version number of the newly added validator node is behind the epoch version number of the change proposal, it is possible to take the source node broadcasting the change proposal as the target validator node and continue the synchronization of the cluster status of the source node of the change proposal. In case where the epoch version number of the newly added change proposal is behind the epoch version number of the validator node, the change proposal may be discarded and the consensus trusted cluster may not be changed in the newly added validator node.

The newly added validator node may also receive a change transaction. When the newly added validator node receives a change transaction, it may generate a change proposal according to the change transaction and broadcast the change proposal to other validator nodes in the consensus trusted cluster. At the same time, regarding the change proposal, the newly added validator node may process the change proposal according to the above-mentioned processing method used in case where the epoch version number of the change proposal is the same as the epoch version number of the newly added validator node.

The solutions in the disclosure have solved the trust problem of the blockchain system after the cluster configuration change, improved the efficiency of synchronizing a new node of the cluster to the correct status, and may determine the correct target status prior to synchronizing blocks.

Figure 7:
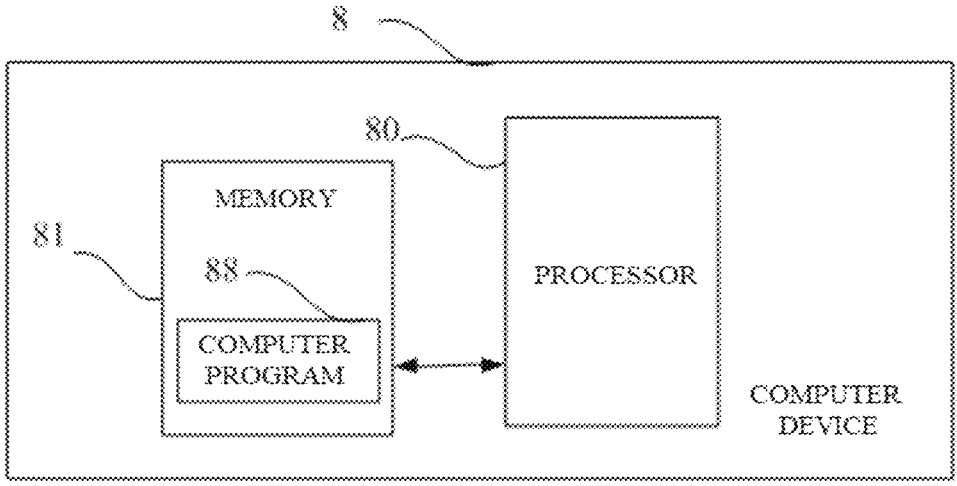
FIG. 7 is a schematic diagram of a computer device provided by the embodiments of the disclosure.

FIG. 7 is a schematic diagram of a computer device provided by one embodiment of the disclosure. As shown in FIG. 7, the computer device 8 of the embodiment includes at least one processor 80 (FIG. 7 only shows one processor), a memory 81, and a computer program 82 stored in the memory 81 and executable on the at least one processor 80. When executing the computer program 82, the processor 80 implements the steps in any of the above method embodiments.

The computer device 8 may be a computing device such as a desktop computer, a notebook, a PDA, and a cloud server. The computer device may include, but is not limited to, a processor 80 and a memory 81. It may be understood by those skilled in the art that FIG. 7 only shows an example of computer device 8 and does not constitute a limitation to the computer device 8, which may include more or fewer parts than shown, or combinations of parts, or different parts, such as input/output devices, network access devices, etc.

The processor 80 may be a Central Processing Unit (CPU). The processor 80 may also be other general-purpose processor, a Digital Signal Processor (DSP), an Application Specific Integrated Circuit (ASIC), a Field Programmable Gate Array (FPGA) or other programmable logic device, a discrete gate or transistor logic device, a discrete hardware component, etc. The general-purpose processor may be a microprocessor, or the processor may be any conventional processor, etc.

The memory 81 in some embodiments may be an internal storage unit of the computer device 8, such as a hard disk or a memory of the computer device 8. In other embodiments, the memory 81 may also be an external storage device of the computer device 8, such as a plug-in hard disk, a Smart Media Card (SMC), a Secure Digital (SD) card, a Flash Card, etc. equipped on the computer device 8. Further, the memory 81 may also include both the internal storage unit of the computer device 8 and the external storage device. The memory 81 is used to store an operating system, an application, a bootloader, data, and other programs, such as program code of the computer program. The memory 81 may also be used to temporarily store data that has been or will be output.

The embodiments of the disclosure also provide a computer-readable storage medium which stores a computer program, which, when executed by a processor, may implement the steps in any of the above method embodiments.

The embodiments of the disclosure provides a computer program product which, when executed on a computer device, enables the computer device to implement the steps in any of the above method embodiments.

Those skilled in the art may understand that it is possible to implement the units and algorithmic steps of each example described in combination with the embodiments disclosed herein with electronic hardware, or with combined computer software and electronic hardware. Whether these functions are performed with hardware or software depends on the particular application and the design constraints of the technical solutions. Those skilled in the art may use different methods to implement the described functions for each particular application, but such implementation should not be considered to go beyond the scope of the disclosure.

The above embodiments are intended only to illustrate the technical solutions of the disclosure rather than limit it. Though the detailed description of the disclosure is provided by reference to the foregoing embodiments, it should be understood by those skilled in the art that they may modify the technical solutions recited in the foregoing embodiments or equivalently replace some of the technical features. And such modification or replacement shall not make the essence of the corresponding technical solution to depart from the spirit and scope of the technical solution of each embodiment of the disclosure, and shall be included in the protection scope of the disclosure.

What is claimed is:

1. A consensus trusted cluster changing method applicable to a blockchain, comprising:

determining a current epoch of a newly added validator node of the consensus trusted cluster in the blockchain and a target epoch of the consensus trusted cluster;

requesting target status information and proof of target cluster change from a target validator node in the target epoch, wherein the proof of target cluster change is used to verify whether the target status information is correct;

verifying the target status information according to the proof of target cluster change; and updating, in case where the target status information has been verified, status information of the newly added validator node according to the target status information to complete change of the consensus trusted cluster.

2. The consensus trusted cluster changing method according to claim 1, wherein verifying the target status information according to the proof of target cluster change comprises:

obtaining a certificate list in the proof of target cluster change, wherein the certificate list comprises one or more certificates;

determining each certificate and verification information corresponding to each certificate;

verifying each certificate respectively by using the verification information;

determining, in case where each certificate has been verified, the target status information has been verified; and determining, in case where any certificate has not been verified, the target status information has not been verified.

3. The consensus trusted cluster changing method according to claim 2, wherein the one or more certificates are correspondingly listed in the certificate list, and determining each certificate and the verification information corresponding to each certificate comprises:

determining a first certificate which is listed first, and taking validator list of the newly added validator node as the verification information of the first certificate;

regarding a second certificate, determining a previous certificate of the second certificate, and taking validator list of the previous certificate as the verification information of the second certificate, wherein the second certificate is any certificate listed other than first in the certificate list.

4. The consensus trusted cluster changing method according to claim 3, wherein verifying each certificate respectively by using the verification information comprises:

determining, for any certificate, validator list, hash value of the certificate and signature information of the certificate corresponding to the verification information of the certificate, wherein the validator list corresponding to the verification information of the certificate comprises public keys of a plurality of validator nodes in the consensus trusted cluster;

verifying the signature information according to the public keys and the hash value; and determining, in case where the signature information has been verified, that the certificate has been verified.

5. The consensus trusted cluster changing method according to claim 1, wherein the consensus trusted cluster changing method further comprises:

voting, in case where a change proposal which is broadcast by other validator nodes and matches the current epoch has been received, on the change proposal, to obtain a first vote message;

broadcasting the first vote message to the other validator nodes of the consensus trusted cluster, and receiving a second vote message broadcast by the other validator nodes;

generating a target certificate according to the received second vote message; and updating, based on the target certificate, the status information of the newly added validator node to complete update of the consensus trusted cluster.

6. The consensus trusted cluster changing method according to claim 5, wherein the second vote message comprises a first epoch version number, and generating the target certificate according to the received second vote message comprises:

determining a number of the second vote messages whose first epoch version number is the same as a second epoch version number of the current epoch;

generating, in case where the number reaches a first preset value, a target validator list according to existing validator nodes in the consensus trusted cluster; and generating, according to the target validator list, the target certificate, where an epoch version number of the target certificate is the same as the second epoch version number.

7. The consensus trusted cluster changing method according to claim 6, wherein updating the status information based on the target certificate comprises:

updating validator list of the newly added validator node as the target validator list; and updating epoch version number of the newly added validator node.

8. The consensus trusted cluster changing method according to claim 5, wherein the consensus trusted cluster changing method further comprises:

adding the target certificate to proof of cluster change of the newly added validator node;

receiving a cluster status request information from other validator nodes, wherein the cluster status request information has a corresponding source node;

returning the updated status information and proof of cluster change to the source node.

9. The consensus trusted cluster changing method according to claim 6, wherein the change proposal has a third epoch version number, and prior to voting on the change proposal to obtain the first vote message, the consensus trusted cluster changing method further comprises:

voting, in case where the third epoch version number is the same as the second epoch version number, on the change proposal, to obtain the first vote message;

requesting, in case where the second epoch version number is behind the third epoch version number, a to-be-updated status information and a to-be-updated proof of cluster change from a validator node that broadcast the change proposal, to update the status information of the newly added validator node according to the to-be-updated status information after the to-be-updated proof of cluster change has been verified; and discarding, in case where the third epoch version number is behind the second epoch version number of the current epoch, the change proposal.

10. The consensus trusted cluster changing method according to claim 5, wherein the consensus trusted cluster changing method further comprises:

creating, in case where change information regarding the consensus trusted cluster has been received from an administrator, a target change proposal based on the change information; and broadcasting the target change proposal to each validator node in the consensus trusted cluster.

11. A computer device comprising a memory, a processor and a computer program stored in the memory and executable on the processor, wherein when executing the computer program, the processor implements a consensus trusted cluster changing method applicable to a blockchain, the consensus trusted cluster changing method comprises:

determining a current epoch of a newly added validator node of the consensus trusted cluster in the blockchain and a target epoch of the consensus trusted cluster;

requesting target status information and proof of target cluster change from a target validator node in the target epoch;

verifying the target status information according to the proof of target cluster change, wherein the proof of target cluster change is used to verify whether the target status information is correct; and updating, in case where the target status information has been verified, status information of the newly added validator node according to the target status information to complete change of the consensus trusted cluster.

12. The computer device according to claim 11, wherein verifying the target status information according to the proof of target cluster change comprises:

obtaining a certificate list in the proof of target cluster change, wherein the certificate list comprises one or more certificates;

determining each certificate and verification information corresponding to each certificate;

verifying each certificate respectively by using the verification information;

determining, in case where each certificate has been verified, the target status information has been verified; and determining, in case where any certificate has not been verified, the target status information has not been verified.

13. The computer device according to claim 12, wherein the one or more certificates are correspondingly listed in the certificate list, and determining each certificate and the verification information corresponding to each certificate comprises:

determining a first certificate which is listed first, and taking validator list of the newly added validator node as the verification information of the first certificate;

regarding a second certificate, determining a previous certificate of the second certificate, and taking validator list of the previous certificate as the verification information of the second certificate, wherein the second certificate is any certificate listed other than first in the certificate list.

14. The computer device according to claim 13, wherein verifying each certificate respectively by using the verification information comprises:

determining, for any certificate, validator list, hash value of the certificate and signature information of the certificate corresponding to the verification information of the certificate, wherein the validator list corresponding to the verification information of the certificate comprises public keys of a plurality of validator nodes in the consensus trusted cluster;

verifying the signature information according to the public keys and the hash value; and determining, in case where the signature information has been verified, that the certificate has been verified.

15. The computer device according to claim 11, wherein the consensus trusted cluster changing method further comprises:

voting, in case where a change proposal which is broadcast by other validator nodes and matches the current epoch has been received, on the change proposal, to obtain a first vote message;

broadcasting the first vote message to the other validator nodes of the consensus trusted cluster, and receiving a second vote message broadcast by the other validator nodes;

generating a target certificate according to the received second vote message; and updating, based on the target certificate, the status information of the newly added validator node to complete update of the consensus trusted cluster.

16. A non-transitory computer-readable storage medium storing a computer program, wherein when executed by a processor, the computer program implements a consensus trusted cluster changing method applicable to a blockchain, the consensus trusted cluster changing method comprises:

determining a current epoch of a newly added validator node of the consensus trusted cluster in the blockchain and a target epoch of the consensus trusted cluster;

requesting target status information and proof of target cluster change from a target validator node in the target epoch, wherein the proof of target cluster change is used to verify whether the target status information is correct;

verifying the target status information according to the proof of target cluster change; and updating, in case where the target status information has been verified, status information of the newly added validator node according to the target status information to complete change of the consensus trusted cluster.

17. The non-transitory computer-readable storage medium according to claim 16, wherein verifying the target status information according to the proof of target cluster change comprises:

obtaining a certificate list in the proof of target cluster change, wherein the certificate list comprises one or more certificates;

determining each certificate and verification information corresponding to each certificate;

verifying each certificate respectively by using the verification information;

determining, in case where each certificate has been verified, the target status information has been verified; and determining, in case where any certificate has not been verified, the target status information has not been verified.

18. The non-transitory computer-readable storage medium according to claim 17, wherein the one or more certificates are correspondingly listed in the certificate list, and determining each certificate and the verification information corresponding to each certificate comprises:

determining a first certificate which is listed first, and taking validator list of the newly added validator node as the verification information of the first certificate;

regarding a second certificate, determining a previous certificate of the second certificate, and taking validator list of the previous certificate as the verification information of the second certificate, wherein the second certificate is any certificate listed other than first in the certificate list.

19. The non-transitory computer-readable storage medium according to claim 18, wherein verifying each certificate respectively by using the verification information comprises:

determining, for any certificate, validator list, hash value of the certificate and signature information of the certificate corresponding to the verification information of the certificate, wherein the validator list corresponding to the verification information of the certificate comprises public keys of a plurality of validator nodes in the consensus trusted cluster;

verifying the signature information according to the public keys and the hash value; and determining, in case where the signature information has been verified, that the certificate has been verified.

20. The non-transitory computer-readable storage medium according to claim 16, wherein the consensus trusted cluster changing method further comprises:

voting, in case where a change proposal which is broadcast by other validator nodes and matches the current epoch has been received, on the change proposal, to obtain a first vote message;

broadcasting the first vote message to the other validator nodes of the consensus trusted cluster, and receiving a second vote message broadcast by the other validator nodes;

generating a target certificate according to the received second vote message; and updating, based on the target certificate, the status information of the newly added validator node to complete update of the consensus trusted cluster.

* * * * *